US009870580B2

(12) United States Patent
Rao et al.

(10) Patent No.: US 9,870,580 B2
(45) Date of Patent: *Jan. 16, 2018

(54) NETWORK-AS-A-SERVICE ARCHITECTURE

(71) Applicant: Verizon Patent and Licensing Inc., Basking Ridge, NJ (US)

(72) Inventors: Ravindra Rao, Sunnyvale, CA (US); Ashay Chaudhary, Redmond, WA (US); Sandeep Sharma, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 632 days.

This patent is subject to a terminal disclaimer.

(21) Appl. No.: 14/271,672

(22) Filed: May 7, 2014

(65) Prior Publication Data

US 2015/0326451 A1 Nov. 12, 2015

(51) Int. Cl.
- *G06Q 30/02* (2012.01)
- *G06Q 30/00* (2012.01)
- *G06Q 30/04* (2012.01)
- *H04L 12/24* (2006.01)

(52) U.S. Cl.
CPC ....... *G06Q 30/0281* (2013.01); *G06Q 30/016* (2013.01); *G06Q 30/04* (2013.01); *H04L 41/5054* (2013.01)

(58) Field of Classification Search
CPC .. G06Q 30/0281; G06Q 30/016; G06Q 30/04; H04L 41/5054
See application file for complete search history.

(56) References Cited

U.S. PATENT DOCUMENTS

| 9,213,564 | B1* | 12/2015 | Klein | G06F 9/45533 |
| 2004/0210895 | A1* | 10/2004 | Esfahany | G06F 11/1482 717/174 |
| 2012/0178414 | A1* | 7/2012 | Fiatal | H04M 3/4872 455/406 |

(Continued)

OTHER PUBLICATIONS

Wikipedia, "Network as a service" http://en.wikipedia.org/wiki/Network_as_a_service, Sep. 16, 2013, 3 pages.

(Continued)

*Primary Examiner* — Asfand Sheikh

(57) ABSTRACT

A system may receive order information that may include information identifying a network service, associated with a service provider network, and a service location associated with the network service. The system may determine context information based on the order information that may include information associated with providing the network service to the service location via the service provider network. The system may generate a service order based on the context information. The system may create a virtual network function (VNF) based on the service request. The VNF may be created such that the VNF operates on a computing device associated with the system, and may be configured to provide the network service. The system may insert the VNF into the service provider network to cause the network service to be provided to the service location. The VNF may interact with a physical device of the service provider network.

20 Claims, 11 Drawing Sheets

(56) References Cited

U.S. PATENT DOCUMENTS

| | | | |
|---|---|---|---|
| 2013/0210464 A1* | 8/2013 | Mittal | H04L 67/18 455/456.5 |
| 2013/0346465 A1* | 12/2013 | Maltz | G06F 9/5072 709/201 |
| 2014/0201374 A1* | 7/2014 | Ashwood-Smith | H04L 49/70 709/226 |
| 2015/0063166 A1* | 3/2015 | Sif | G06F 9/45558 370/254 |
| 2015/0326448 A1* | 11/2015 | Chaudhary | G06Q 20/14 705/40 |
| 2015/0326535 A1* | 11/2015 | Rao | H04L 41/5054 726/15 |

OTHER PUBLICATIONS

Harish Vadada, "Network as a Service (NaaS)", http://www.telecom-cloud.net/network-as-a-service/, Jul. 16, 2011, 15 pages.
Wikipedia, "Network Functions Virtualization", http://en.wikipedia.org/wiki/Network_Functions_Virtualization, Apr. 24, 2014, 4 pages.

* cited by examiner

NETWORK-AS-A-SERVICE ARCHITECTURE

BACKGROUND

Network-as-a-Service (NaaS) is a service model that allows a service provider to provide a virtual network service to a third party. In some cases, NaaS may allow the service provider to provide a network service such as a virtual private network (VPN), bandwidth on demand, custom routing, multicast protocols, a security firewall, intrusion detection and prevention, content monitoring and filtering, and/or antivirus protection.

DETAILED DESCRIPTION OF PREFERRED EMBODIMENTS

The following detailed description of example implementations refers to the accompanying drawings. The same reference numbers in different drawings may identify the same or similar elements.

A service provider, associated with a service provider network, may wish to implement a network-as-a-Service (NaaS) service model that allows the service provider to provide agile, on-demand, and/or flexible network services (e.g., virtual network services) to a service location associated with a customer. However, provisioning of network services within the service provider network may be hardware based and the service provider network may be a closed system. As such, the service provider may be forced to manually configure, monitor, update, etc. devices included in the service provider network in order to provide the network service. Moreover, updating, modifying, adjusting, etc. the network service based on a request from the customer may be difficult and time consuming (e.g., since an update would require additional manual configuration). Implementations described herein may allow a virtual network function, associated with providing a network service to a service location, to be created and inserted into a service provider network such that the network service is provided to the service location in an agile, on-demand, and/or flexible manner without the need to manually configure, monitor, and/or update devices in the service provider network.

Figure 1A:
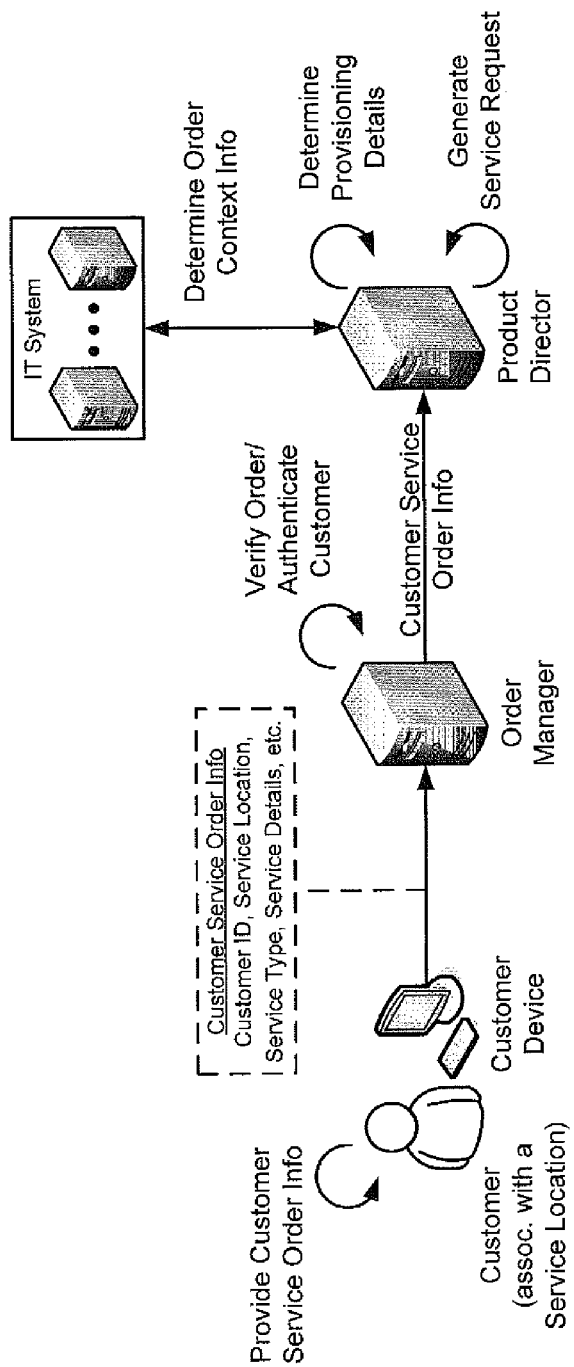
FIGS. 1A-1C are diagrams of an overview of an example implementation described herein.
Figure 1B:
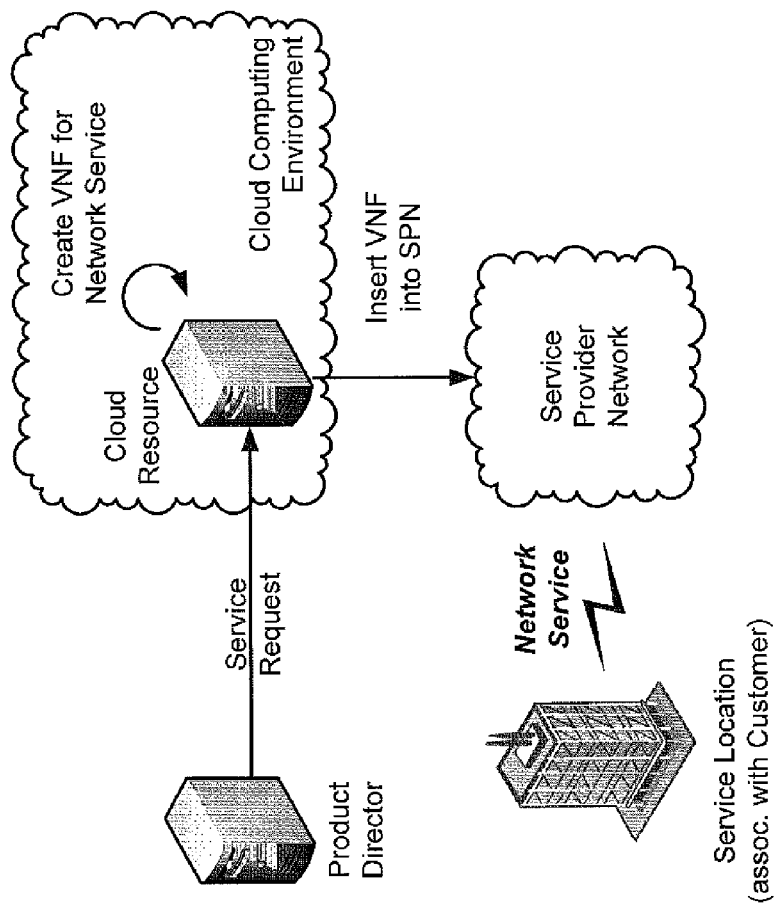
Figure 1C:
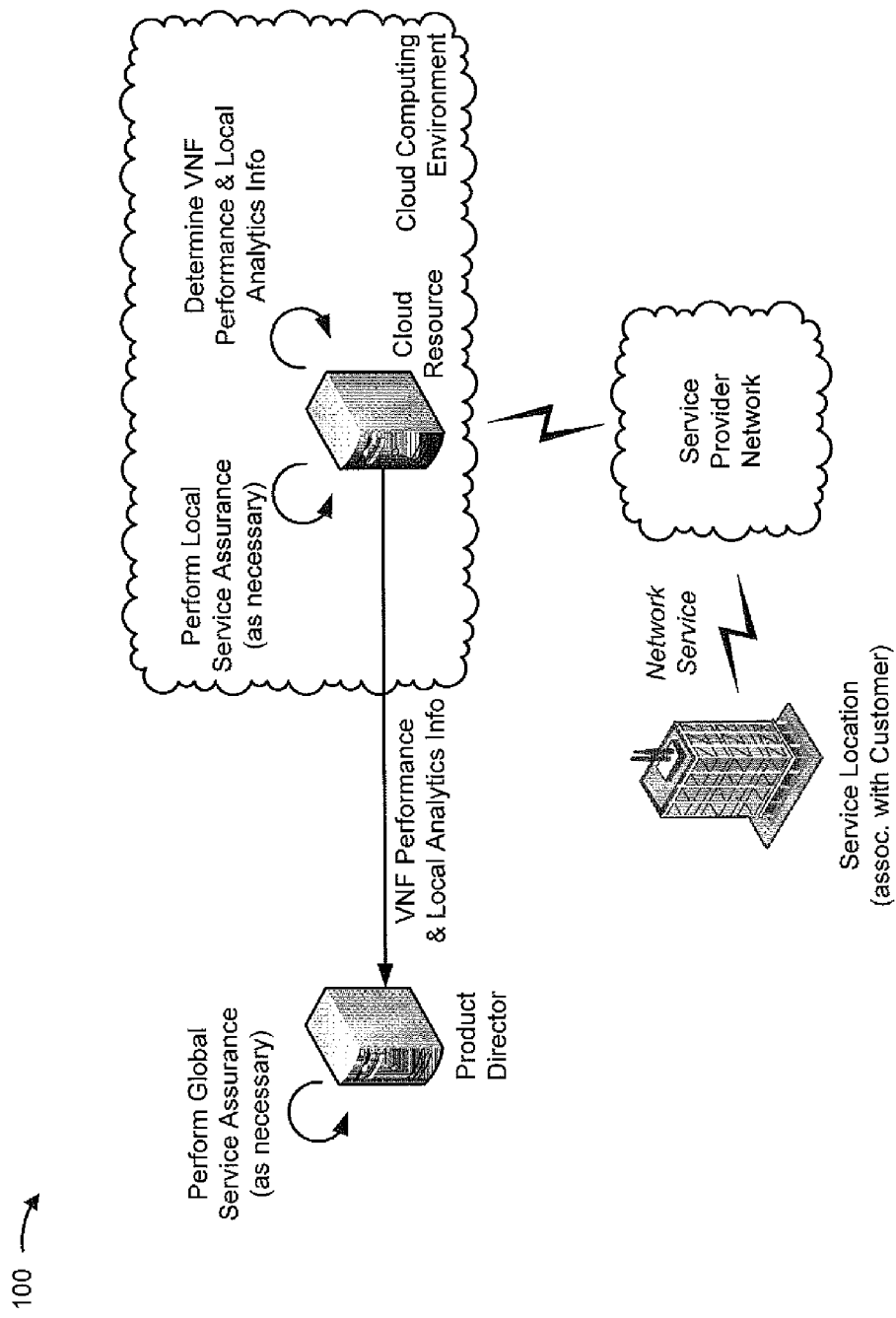

FIGS. 1A-1C are diagrams of an overview of an example implementation 100 described herein. For the purposes of example implementation 100, assume that a customer, associated with a service location (e.g., a home, a business, etc.) wishes for a network service to be provided, via a service provider network, to the service location.

As shown in FIG. 1A, the customer may provide (e.g., via a user interface displayed on a customer device) customer service order information associated with the network service to be provided to the service location. As shown, the customer service order information may include information that identifies the customer (e.g., a customer identifier), information that identifies the service location, information that identifies the type of the network service, and/or other details regarding the network service to be provided to the service location. As shown, the customer device may provide the customer service order information to an order manager associated with the service provider network.

As further shown, the order manager may verify the order, and may authenticate the customer. As shown, the order manager may forward the customer service order information to a product director associated with the service provider. As further shown, the product director may determine (e.g., based on information stored by an information technology (IT) system associated with the service provider) context information based on the customer service order information. As further shown, the product director may also determine provisioning details associated with the service order. As shown, the product director may then generate a service request based on the context information.

As shown in FIG. 1B, the product director may provide the service request to a cloud resource (e.g., a resource, included in a cloud computing environment and identified by the product director, that is to provide the network service to the service location). As further shown, the cloud resource may receive the service request and may create, based on the service request, a virtual network function (VNF) that is configured to provide the network service. As shown, the cloud resource may then insert the VNF into the service provider network such that the network service is provided to the service location.

As shown in FIG. 1C, the cloud resource may determine performance information and/or local analytics information associated with the VNF (e.g., after inserting the VNF into the service provider network). As further shown, the cloud resource may perform local service assurance associated with the cloud resource (e.g., to assure that the network service is provided to the service location in accordance with a service level agreement (SLA) associated with the customer). As shown, the cloud resource may provide the performance information and/or the local analytics information to the product director (e.g., when the product director is configured to receive performance information and/or local analytics information from a group of cloud resources). As shown, the product director may perform global service assurance (e.g., associated with the group of cloud resources) based on the performance information and/or the local analytics information.

In this way, a virtual network function, associated with providing a network service to a service location, may be created and inserted into a service provider network such that the network service is provided to the service location in an agile, on-demand, and/or flexible manner.

Figure 2:
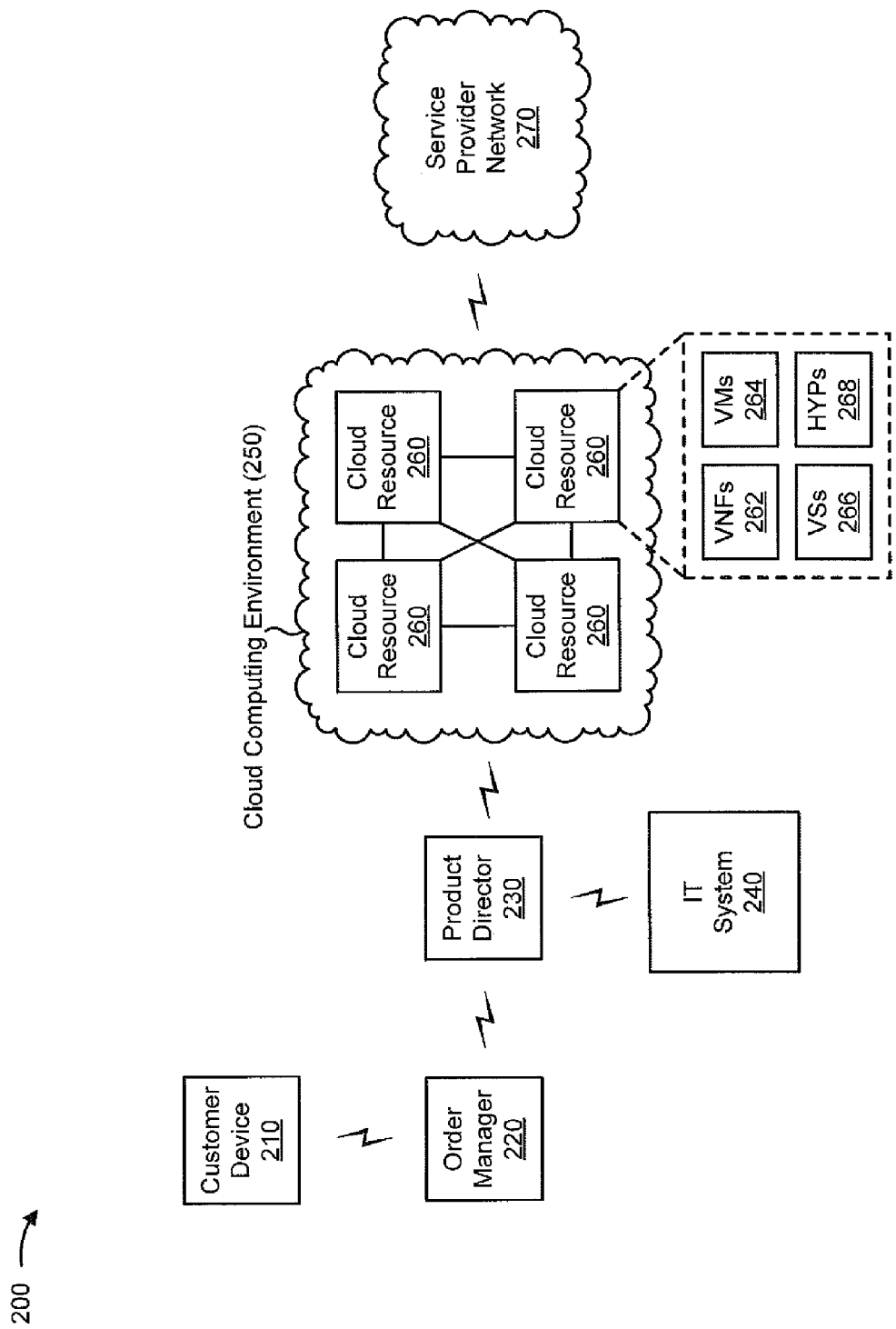
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a customer device 210, an order manager 220, a product director 230, an information technology (IT) system 240, a cloud computing environment 250, and a service provider network 270. Cloud computing environment may include a group of cloud resources 260. Devices of environment 200 may interconnect via wired connections, wireless connections, or a combination of wired and wireless connections.

Customer device 210 may include a device capable of receiving, processing, and/or providing information (e.g., customer service order information). For example, customer device 210 may include a mobile phone (e.g., a smart phone, a radiotelephone, etc.), a computing device (e.g., a laptop computer, a tablet computer, a handheld computer, a gaming device, etc.), a network device (e.g. Customer Premises Equipment (CPE), a router, etc.), or a similar device. In some implementations, customer device 210 may be host an application (e.g., a user input web portal, a cloud services portal, etc.), that may allow the user to provide customer service order information associated with a network service. In some implementations, customer device 210 may include a communication interface that allows customer device 210 to receive (e.g., based on user input) customer service order information associated with providing a network service to a service location. Additionally, or alternatively, customer device 210 may be capable of providing the customer service order information to another device in environment 200 (e.g., order manager 220).

Order manager 220 may include one or more devices capable of receiving, storing, processing, generating, and/or providing customer service order information. For example, order manager 220 may include a server device or a collection of server devices. In some implementations, order manager 220 may include a communication interface that allows order manager 220 to receive customer service order information from customer device 210 and/or forward the customer service order information to other devices in environment 200 (e.g., product director 230). In some implementations, order manager 220 may include a device capable of receiving the customer service order information, verifying the customer service order information, and/or authenticating a customer associated with the customer service order information.

Product director 230 may include one or more devices capable of receiving, storing, processing, generating, and/or providing customer service order information, context information associated with the customer service order information, and/or another type of information. For example, order manager 220 may include a server device or a collection of server devices. In some implementations, product director 230 may be capable of communicating with order manager 220 to receive customer service order information. Additionally, or alternatively, product director 230 may be capable of communicating with IT system 240 to determine context information associated with the customer service order information received from order manager 220. Additionally, or alternatively, product director 230 may be capable of generating a service request based on the context information received from IT system 240, and providing the service request to cloud resource 260.

In some implementations, product director 230 may be associated with multiple cloud resources 260. For example, product director 230 may be configured to manage network services provided via a group of cloud resources 260. In some implementations, each product director 230 could be associated with a respective geographic region and cloud resources 260 also associated with that respective geographic region. Additionally, or alternatively, product director 230 may be capable of identifying a particular cloud resource 260 that is to create and insert a network service associated with customer service order information received from order manager 220. In some implementations, product director 230 may be capable of receiving performance information and/or local analytics information from the multiple cloud resources 260, and performing global service assurance associated with the multiple cloud resources 260.

IT system 240 may include one or more devices capable of receiving, storing, processing, generating, and/or providing context information and/or another type of information. For example, IT system 240 may include a server device or a collection of server devices. In some implementations, IT system 240 may be capable of communicating with product director 230 to provide context information associated with customer service order information. In some implementations, IT system 240 may include one or more devices (e.g., server devices) that are configured to store context information and/or to provide the context information to product director 230.

Cloud computing environment 250 may include an environment that delivers computing as a service, whereby shared resources, services, etc. may be provided to customer device 210. Cloud computing environment 250 may provide computation, software, data access, storage, etc. services that do not require end-user (e.g., customer device 210) knowledge of a physical location and configuration of system(s) and/or device(s) that deliver the services.

As shown, cloud computing environment 250 may include a group of cloud resources 260 (referred to collectively as "cloud resources 260" and individually as "cloud resource 260").

Cloud resource 260 may include one or more computing devices. In some implementations, cloud resource 260 may provide network services to customer device 210. The network services may use compute instances executing in cloud resource 260, storage devices provided in cloud resource 260, data transfer operations executed by cloud resource 260, etc. In some implementations, cloud resource 260 may communicate with other cloud resources 260 via wired connections, wireless connections, or a combination of wired and wireless connections. In some implementations, one or more cloud resources 260 may be assigned (e.g., by a device associated with a service provider, etc.) to receive, process, store and/or provide traffic, associated with a customer, in accordance with an agreement (e.g., a service level agreement ("SLA")).

In some implementations, cloud resource 260 may be capable of receiving a service request associated with providing a network service, creating a VNF associated with the network service (e.g., within cloud resource 260), and inserting the VNF into service provider network 270 (e.g., such that the network service is provided via the VNF). In some implementations, cloud resource 260 may be capable of determining performance information associated with network services provided via VNFs running on cloud resource 260, and performing local service assurance based on the performance information and/or local analytics information determined by cloud resource 260.

As further shown in FIG. 2, cloud resource 260 may include a group of resources, such as one or more virtual network functions (VNFs) 262, one or more virtual machines ("VMs") 264, virtualized storage ("VSs") 266, one or more hypervisors ("HYPs") 268, etc.

VNF 262 may include one or more network functions that may be provided to or accessed by customer device 210. VNF 262 may eliminate a need to install and execute the network functions on customer device 210 and/or another device associated with customer device 210. For example, VNF 262 may include a network function associated with a firewall, a load balancer, malware detection, and/or any other network function capable of being provided via cloud computing environment 250. In some implementations, one VNF 262 may send/receive information to/from one or more other VNF 262, via virtual machine 264.

Virtual machine 264 may include a software implementation of a machine (e.g., a computer) that executes programs like a physical machine. Virtual machine 264 may be either a system virtual machine or a process virtual machine, depending upon use and degree of correspondence to any real machine by virtual machine 264. A system virtual machine may provide a complete system platform that supports execution of a complete operating system ("OS"). A process virtual machine may execute a single program, and may support a single process. In some implementations, virtual machine 264 may execute on behalf of a customer (e.g., customer device 210) to provide a network service to a service location associated with the customer. In some implementations, a VNF may correspond to one or more applications 262, virtual machines 264, virtualized storages 266, and/or hypervisors 268.

Virtualized storage 266 may include one or more storage systems and/or one or more devices that use virtualization techniques within the storage systems or devices of cloud resource 260. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 268 may provide hardware virtualization techniques that allow multiple virtual machines 264 to execute concurrently on a host computer, such as computing resource 260. Hypervisor 268 may present a virtual operating platform to virtual machines 264, and may manage the execution of the virtual machines 264. Multiple instances of a variety of virtual machines 264 may share virtualized hardware resources. Hypervisor 268 may provide an interface to infrastructure as a service provided by cloud computing environment 250.

Service provider network 270 may include one or more wired and/or wireless networks associated with a service provider. For example, service provider network 270 may include a cellular network, a public land mobile network (PLMN), a second generation (2G) network, a third generation (3G) network, a fourth generation (4G) network, a fifth generation (5G) network, a long term evolution (LTE) network, and/or a similar type of network. Additionally, or alternatively, service provider network 270 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a satellite network, a cloud computing network, and/or a combination of these or other types of networks. In some implementations, service provider network 270 may include network devices (e.g., base stations, gateways, routers, modems, switches, network interface cards ("NIC"), hubs, bridges, servers, etc.) that may be configured to provide a network service to a service location associated with a customer.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
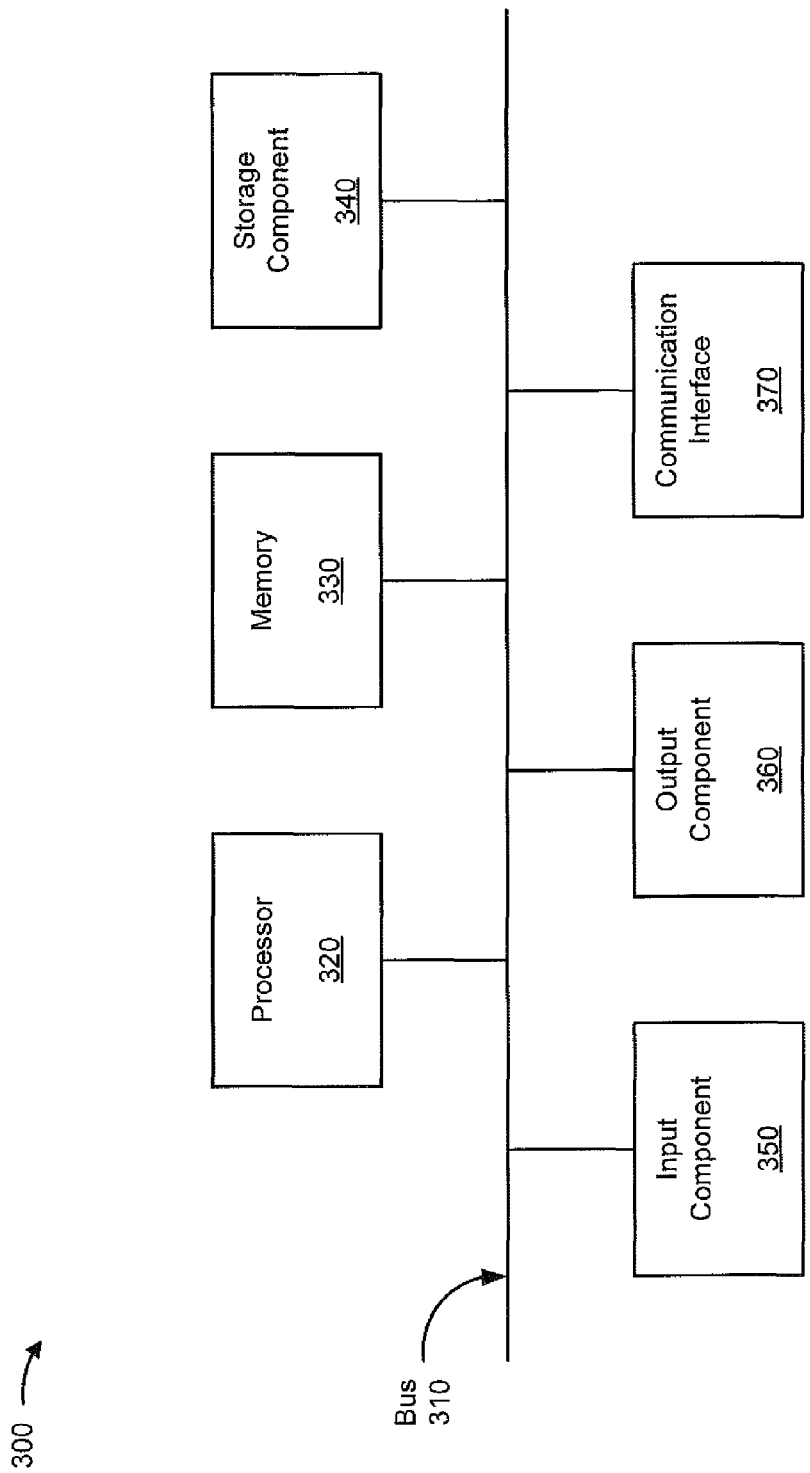
FIG. 3 is a diagram of example components of one or more devices of FIG. 2.

FIG. 3 is a diagram of example components of a device 300. Device 300 may correspond to customer device 210, order manager 220, product director 230, one or more devices of IT system 240, and/or cloud resource 260. In some implementations, customer device 210, order manager 220, product director 230, IT system 240, and/or cloud resource 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
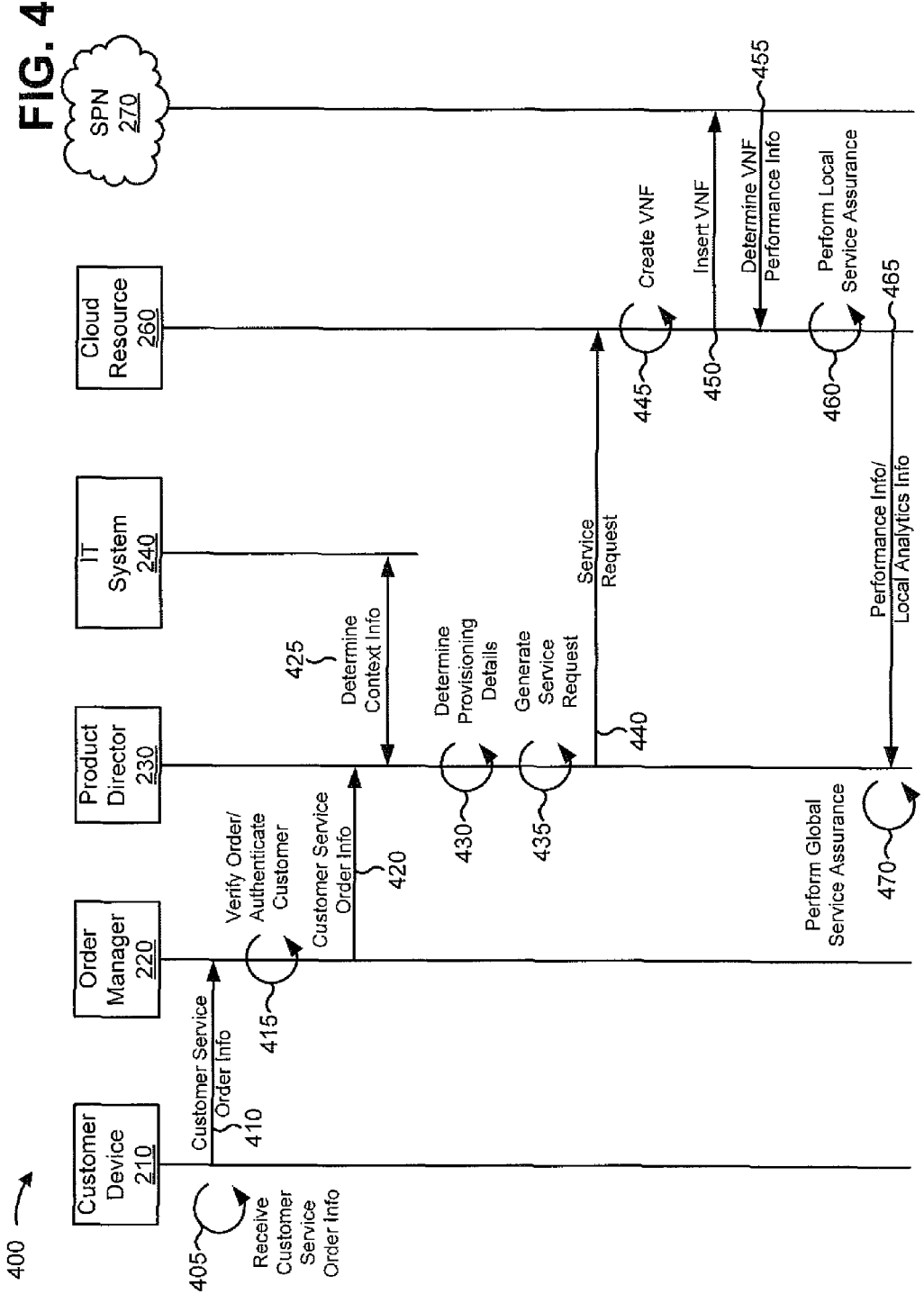
FIG. 4 is a call flow diagram of an example process for creating a virtual network function associated with providing a network service, inserting the virtual network function into a service provider network to allow the network service to be provided to the service location, and monitoring performance information associated with the virtual network function.

FIG. 4 is a call flow diagram of an example process 400 for creating a virtual network function associated with providing a network service, inserting the virtual network function into a service provider network to allow the network service to be provided to the service location, and monitoring performance information associated with the virtual network function. In some implementations, one or more operations of FIG. 4 may be performed by one or more devices included in environment 200.

As shown in FIG. 4, process 400 may include receiving customer service order information associated with a network service to be provided via a service provider network (shown at reference number 405). For example, customer device 210 may receive customer service order information associated with a network service to be provided via service provider network 270. In some implementations, customer device 210 may receive the customer service order information when a customer (e.g., a user of customer device 210) provides user input associated with the customer service order information.

Customer service order information may include information associated with a network service to be provided to a service location via a service provider network. For example, the customer service order information may include information that identifies a customer associated with the network service (e.g., a customer name, a customer identification (ID) number, a customer username, a customer password, SLA information associated with the customer, etc.), information that identifies the network service (e.g., a name of the service, a service type of the service, etc.), information that identifies the service location (e.g., a service location name, a service location address, a service location ID number, etc.), timing information associated with the network service (e.g., a date that provisioning of the network service is to begin, a date that provisioning of the network service is to end, a time of day that the network service is to be provided, a day of the week that the network service is to be provided, etc.), and/or other information associated with network service. Additionally, or alternatively, the customer service order information may include information that identifies desired configuration information associated with the network service (e.g., a desired amount of bandwidth, a desired amount of random access memory (RAM), a desired amount of computing resources, a desired amount of memory storage, etc.). In some implementations, configuration information may be determined, by product director 230, based on the desired configuration information, as discussed below. In some implementations, the customer service order information may be associated with initiating a network service, modifying a network service, adding a network service, and/or terminating a network service.

In some implementations, customer device 210 may receive the customer service order information via a user interface associated with the service provider. For example, the customer may wish for the service provider to initiate provisioning of the network service, and may navigate to a service provider web site (e.g., associated with order manager 220) that may be used to order the network service from the service provider. In this example, the service provider web site may include a user interface that allows the customer to provide input associated with the customer service order information.

As further shown in FIG. 4, process 400 may include providing the customer service order information (shown at reference number 410). For example, customer device 210 may provide the customer service order information to order manager 220. In some implementations, customer device 210 may provide the customer service order information after customer device 210 receives the customer service order information from the customer. Additionally, or alternatively, customer device 210 may provide the customer service order information after the customer instructs customer device 210 to provide the customer service order information.

As further shown in FIG. 4, process 400 may include verifying the customer service order information and authenticating the customer associated with the customer service order information (shown at reference number 415). For example, order manager 220 may verify the customer service order information and may authenticate the customer associated with the customer service order information. In some implementations, order manager 220 may verify the customer service order information and may authenticate the customer after order manager 220 receives the customer service order information from customer device 220.

In some implementations, verifying the customer service order information may include determining that the customer service order information includes information required to initiate a customer service order associated with the customer service order information (e.g., that the customer service order information is complete customer service order information). For example, order manager 220 may determine whether the customer service order information includes information required to determine context information associated with the customer service order information. If the customer service order information does not include the information required to determine the context information, then order manager 220 may provide, to customer device 210, a notification indicating that the customer service order does not include the required information. Customer device 210 may then provide the notification to the customer (e.g., such that the customer may provide additional and/or different customer service order information). In other words, order manager 220 may identify information missing from the customer service order information, and may notify the customer so that the customer may provide the missing information.

Additionally, or alternatively, order manager 220 may authenticate the customer associated with the customer service order. For example, order manager 220 may receive customer service order information that includes a username and a password associated with the customer. In this example, order manager 220 may determine (e.g., based on information stored by order manager 220, IT system 240, etc.) whether the password correctly corresponds to the username. If the password is incorrect, then order manager 220 may provide, to customer device 210, a notification indicating that the customer service order information does not include the correct username and/or password (e.g., such that the customer may provide another username and/or password). Additionally, or alternatively, order manager 220 may create a customer account (e.g., when the customer service order information indicates that the customer service order information is associated with a new customer).

As further shown in FIG. 4, process 400 may include forwarding the customer service order information (shown at reference number 420). For example, order manager 220 may forward the customer service order information to product director 230. In some implementations, order manager 220 may forward the customer service order information after order manager 220 verifies the customer service order information and/or authenticates the customer associated with the customer service order information.

As further shown in FIG. 4, process 400 may include determining context information based on the customer service order information (shown at reference number 425). For example, product director 230 may determine context information based on the customer service order information received from order manager 220. In some implementations, product director 230 may determine the context information after product director 230 receives the customer service order information from order manager 220. Additionally, or alternatively, product director 230 may determine the context information after product director 230 determines (e.g., based on information stored by IT system 240) that the network service is available at the service location (e.g., and product director 230 notifies the customer via customer device 210), as discussed below.

Context information may include information associated with creating a VNF (e.g., a service virtual machine (VM) configured to run on a hypervisor) that is to provide the network service, and inserting the VNF into the service provider network. For example, the context information may include information associated with the customer (e.g., a customer name, a customer ID, a customer account number, a username, a password, etc.), information associated with the network service (e.g., a service type of the network service, a quantity of devices to be provided with the network service, etc.), network insertion information associated with inserting the VNF into the service provider network (e.g., a port identifier, routing information, virtual routing and forwarding information, etc.), or another type of information.

In some implementations, product director 230 may determine the context information based on information stored by IT system 240. For example, product director 230 may receive the customer service order information, may determine that the network service is available to the service location, and may send, to IT system 240, one or more requests for IT system 240 to provide the context information. IT system 240 may receive the one or more requests, may determine (e.g., based on information stored by IT system 240), the context information, and may provide the context information to product director 230. In some implementations, IT system 240 may include one or more databases that store the context information.

In some implementations, product director 230 may determine whether the service is available to the service location before determining the context information. For example, product director 230 may receive the customer service order information and may send, to IT system 240, a request associated with determining whether the network service is available to the service location. In this example, IT system 240 may provide, to product director 230, information indicating whether the network service is available to the service location, and product director 230 may determine (e.g., based on information provided by IT system 240) whether the network service is available to the service location, accordingly. If the network service is available at the service location, product director 230 may provide, to the customer, (e.g., via order manager 220 and/or customer device 210) an indication that the network service is available, and an estimated time (e.g., 2 hours, 3 days, etc.) associated with initiating the network service. If the network service is not available at the service location, product director may provide, to the customer, an indication that the network service is not currently available, and/or may provide an estimated time (e.g., 6 months, 1 year) that the network service may be available.

As further shown in FIG. 4, process 400 may include determining provisioning details associated with the network service (block 430). For example, product director 230 may determine provisioning details associated with the network service. In some implementations, product director 230 may determine the provisioning details after product director 230 determines the context information. Additionally, or alternatively, product director 230 may determine the provisioning details after product director 230 receives the customer service order information (e.g., before product director 230 determines the context information).

Provisioning details, associated with the network service, may include location information associated with the network service (e.g., a geographic location of cloud resource 260 that is to provide the network service, a logical location of cloud resource 260 that is to provide the network service, etc.), timing information associated with the network service (e.g., a time of day when provisioning of the service is to be initiated, a period of time during the network service is to be provided, etc.), quality of service (QoS) information associated with the network service (e.g., a QoS level at which the network service may be provided, etc.), pricing information associated with the network service (e.g., a cost associated with provisioning of the network service), and/or another type of information.

Additionally, or alternatively, the provisioning details may include configuration information associated with the VNF that is to provide the network service, such as sizing information (e.g., an amount of computing resources, an amount of RAM, an amount of storage, etc.), tuning information (e.g., when the network service requires a non-default VNF), and/or another type of configuration information. In some implementations, product director 230 may determine the configuration information based on the desired configuration information included in the customer service order (e.g., product director 230 may determine whether or not the VNF may be configured based on the desired configuration information).

In some implementations, product director 230 may determine the provisioning details based on information associated with product director 230. For example, product director 230 may store information associated with a heuristic algorithm associated with determining the provisioning details. In this example, product director 230 may determine (e.g., based on information received from one or more cloud resources 260) real-time information associated with network services being provided by the one or more cloud resources 260. Here, product director 230 may use the customer service order information, the real-time information, the context information, and/or the heuristic algorithm to determine the provisioning details associated with the network service.

In some implementations, product director may perform steps 425 and 430 multiple times and/or in reverse order. In other words, determining the context information and/or the provisioning details may require product director 230 to determine context information and/or provision details multiple times before a service request may be generated and provided to cloud resource 260.

As further shown in FIG. 4, process 400 may include generating a service request based on the context information and the provisioning details (shown at reference number 435). For example, product director 230 may generate a service request based on the context information and the provisioning details. In some implementations, product director 230 may generate the service request after product director 230 determines the context information. Additionally, or alternatively, product director 230 may generate the service request after product director 230 determines the provisioning details.

A service request may include context information and/or provisioning details prepared in a format that may be used by cloud resource 260 to create and insert the VNF such that the network service is provided to the service location. In some implementations, the service request may be generated in a manner (e.g., using a particular protocol, in a particular format, etc.) such that product director 230 need only provide a single service request to cloud resource 260 (e.g., rather than providing multiple service requests) to cause cloud resource 260 to create and insert the VNF. In some implementations, the service request may include the context information and/or the provisioning details associated with the network service. Additionally, or alternatively, the service request may include the customer service order information. Additionally, or alternatively, product director 230 may generate multiple copies of a service request to allow the service request to be provided to multiple cloud resources 260.

As further shown in FIG. 4, process 400 may include providing the service request (shown at reference number 440). For example, product director 230 may provide the service request to cloud resource 260. In some implementations, product director 230 may provide the service request after product director 230 generates the service request based on the context information, the provisioning details, and/or the customer service order information. Additionally, or alternatively, product director 230 may provide the service request after product director 230 identifies cloud resource 260 that is to receive the service request, as discussed below.

In some implementations, product director 230 may provide the service request based on timing information associated with the network service. For example, the provisioning details, associated with the network service, may include timing information that identifies a time (e.g., a date that the network service is to be initiated, a period of time during which the network service is to be provided, etc.) associated with providing the network service, and product director 230 may provide the service request to cloud resource 260 based on the timing information.

In some implementations, product director 230 may identify cloud resource 260 that is to receive the service request before product director 230 provides the service request. In other words, product director 230 may identify (e.g., based on the provisioning details, based on the context information) a particular cloud resource 260, of a group of cloud resources 260 managed by product director 230, to create and insert the VNF associated with the service request. In some implementations, product director 230 may identify cloud resource 260 based on a geographic area associated with cloud resource 260. For example, product director 230 may be associated with multiple cloud resources 260, and each cloud resource 260 may be configured to provide network services for a corresponding geographic area. In this example, the service request may be associated with a network service to be provided to a service location located within a particular geographic area. As such, product director 230 may provide the service request to a particular cloud resource 260 that is configured to provide network services for the particular geographic area. Additionally, or alternatively, each product director 230 could be associated with a respective logical group of cloud resources 260 (e.g., a group of cloud resources 260 associated with providing network services at a particular time, a group of cloud resources 260 associated with a particular customer type, a group of cloud resources associated with providing network services within a particular price band, etc.) Additionally, or alternatively, product director 230 may identify cloud resource 260 in another manner (e.g., based on a quantity of remaining computing capacity of cloud resource 260, based on a speed at which cloud resource 260 is able to create and insert the VNF, based on a predicted workload growth associated with cloud resource 260, based on a planned cloud resource 260 outage, based on a semi-planned cloud resource 260 outage, etc.).

In some implementations, product director 230 may determine whether cloud resource 260, identified by product director 230, is available to provide the network service. For example, product director 230 may identify cloud resource 260 and may determine (e.g., based on performance information and/or local analytics information previously received from cloud resource 260, based on a request provided to cloud resource 260, etc.) whether cloud resource 260 has sufficient resources (e.g., processing power, RAM, memory storage space, etc.) available to provide the network service. If cloud resource 260 has sufficient computing resources available, then product director 230 may provide the service request to cloud resource 260. Alternatively, if cloud resource 260 does not have sufficient computing resources available, then product director 230 may identify another cloud resource 260 to provide the network service, and may provide the service request to the other cloud resource 260.

As further shown in FIG. 4, process 400 may include creating a VNF based on the service request (shown at reference number 445). For example, cloud resource 260 may create a VNF based on the service request received from product director 230. In some implementations, cloud resource 260 may create the VNF when cloud resource 260 receives the service request from product director 230. Additionally, or alternatively, cloud resource 260 may create the VNF after cloud resource 260 determines that cloud resource 260 has sufficient computing resources available to provide the network service. Additionally, or alternatively, cloud resource 260 may create the VNF after cloud resource 260 parses the service request received from product director 230.

In some implementations, when creating the VNF, cloud resource 260 may create a VNF that is configured to provide the network service associated with the service request. For example, a server device included in cloud resource 260 may include a hypervisor associated with managing VNFs associated with providing network services, and cloud resource 260 may create a VNF on the hypervisor such that the VNF is configured to provide the network service.

In some implementations, cloud resource 260 may parse the service request before creating the VNF based on the service request. For example, cloud resource 260 may receive the service request from product director 230, and may parse the service request to determine the contents of the service request. In this example, cloud resource 260 may determine the contents of the service request (e.g., the context information and/or the provisioning details included in the service request) and may create the VNF based on the contents of the service request.

As further shown in FIG. 4, process 400 may include inserting the VNF into a service provider network (shown at reference number 450). For example, cloud resource 260 may insert the VNF into service provider network 270. In some implementations, cloud resource 260 may insert the VNF into service provider network 270 after cloud resource 260 creates the VNF.

In some implementations, cloud resource 260 may insert the VNF into service provider network 270 by configuring the VNF created by cloud resource 260. For example, cloud resource 260 may configure the VNF to communicate with an edge router (e.g., associated with cloud resource 260) that is configured to receive and/or provide traffic to and/or from service provider network 270. Additionally, or alternatively, cloud resource 260 may insert the VNF into service provider network 270 by configuring physical devices included in service provider network 270. For example, cloud resource 260 may insert the network service into service provider network 270 by providing information included in the service request to a router, associated with routing traffic to and/or from the service location, included in service provider network 270 (e.g., such that the router is configured to route traffic to and/or receive traffic from the VNF included in cloud resource 260, rather than receiving and/or providing the traffic directly from and/or to the service location). In other words, the VNF may be inserted into service provider network 270 such that the VNF interacts with physical devices included in service provider network 270 in order to provide the network service to the service location.

In some implementations, cloud resource 260 may provide an indication after cloud resource 260 inserts the VNF into service provider network 270. For example, cloud resource 260 may insert the VNF (e.g., such that the network service is provided to the service location), and cloud resource 260 may provide, to a billing device associated with the service provider network, an indication that billing for the network service is to be initiated. In this example, the billing device may receive the indication, and may initiate billing for the network service.

In this way, a network service may be ordered by a customer, created in the form of a VNF, and inserted into service provider network 270 without the need to manually configure, monitor, and/or update devices in the service provider network. Similarly, this NaaS architecture may allow the customer to modify the provisioning of the network service, and the network service may be automatically modified in a timely manner (e.g., since no manual configuration and/or updating is necessary).

As further shown in FIG. 4, process 400 may include determining performance information associated with the virtual network function (shown at reference number 455). For example, cloud resource 260 may determine performance information associated with the VNF inserted into service provider network 270 by cloud resource 260. In some implementations, cloud resource 260 may determine the performance information after cloud resource 260 inserts the VNF into service provider network 270.

Performance information associated with the VNF may include one or more performance metrics associated with the VNF. For example, the performance information may include an amount of computing resources consumed by the VNF, an amount of RAM used by the VNF, an amount of memory storage used by the VNF, an amount of bandwidth used by the VNF, and/or another type of performance metric. In some implementations, cloud resource 260 may determine the performance information in-real time, on a periodic basis (e.g., every 5 seconds, every 30 seconds, etc.), or in another manner. Additionally, or alternatively, cloud resource 260 may determine the performance information based on an indication (e.g., provided by an administrator of service provider network 270) that cloud resource 260 is to determine the performance information. In some implementations, the performance information may be used (e.g., by cloud resource 260) to perform local service assurance and/or used (e.g., by product director 230) to perform global service assurance, as discussed below.

As further shown in FIG. 4, process 400 may include performing local service assurance associated with the virtual network function (shown at reference number 460). For example, cloud resource 260 may perform local service assurance (e.g., service assurance with cloud resource 260) associated with the VNF. In some implementations, cloud resource 260 may perform local service assurance as cloud resource 260 determines the performance information associated with the VNF (e.g., in real-time). Additionally, or alternatively, cloud resource 260 may perform local service assurance after cloud resource 260 determines the performance information associated with the VNF (e.g., on a periodic basis). Additionally, or alternatively, cloud resource 260 may perform local service assurance based on receiving an indication that cloud resource 260 is to perform local service assurance.

When performing local service assurance, cloud resource 260 may monitor, modify, update, reconfigure, adjust, etc. a VNF running on cloud resource 260 to assure that a network service, associated with the VNF, is being adequately provided to the service location (e.g., provided in accordance with an SLA associated with the network service). In some implementations, cloud resource 260 may perform local service assurance by relocating the VNF associated with the network service. For example, if cloud resource 260 determines (e.g., based on performance information associated with a VNF running on a first computing device) that an amount of computing resources required by the VNF is not available, then cloud resource 260 may relocate the VNF to a second computing device (e.g., when the second computing device has sufficient computing resources available). Additionally, or alternatively, cloud resource 260 may perform local service assurance by modifying, updating, reconfiguring, adjusting, etc. the VNF in another manner.

Additionally, or alternatively, cloud resource 260 may perform local service assurance based on local analytics information associated with cloud resource 260. For example, cloud resource 260 may receive performance information associated with the VNF, may perform (e.g., based on an algorithm, a model, etc.) local analytics based on the performance information to determine local analytics information (e.g., analytics information associated with cloud resource 260). In this example, cloud resource 260 may modify the VNF based on the local analytics information (e.g., to ensure that the network service is adequately provided). As another example, cloud resource 260 may perform local analytics based on performance information associated with the VNF, and the local analytics information may identify a traffic pattern associated with the VNF. In this example, cloud resource 260 may use the local analytics information to predict a future traffic pattern associated with the VNF, and cloud resource 260 may reconfigure the VNF, based on the predicted future traffic pattern, to ensure that the network service is adequately provided. In some implementations, cloud resource 260 may perform local service assurance for multiple VNFs running on cloud resource 260 (e.g., such that cloud resource 260 ensures provisioning of multiple network services corresponding to the multiple VNFs).

As further shown in FIG. 4, process 400 may include providing the performance information and/or the local analytics information associated with the VNF (shown at reference number 465). For example, cloud resource 260 may provide the performance information and/or the local analytics information, associated with the VNF running on cloud resource 260, to product director 230. In some implementations, cloud resource 260 may provide the performance information and/or the local analytics information after cloud resource 260 performs local service assurance associated with the VNF. Additionally, or alternatively, cloud resource 260 may provide the performance information and/or the local analytics information as cloud resource 260 determines the performance information and/or performs local analytics associated with the VNF (e.g., in real-time). Additionally, or alternatively, cloud resource 260 may provide the performance information and/or the local analytics information on a periodic basis (e.g., every 10 seconds, every one minute, etc.).

As further shown in FIG. 4, process 400 may include performing global service assurance (shown at reference number 470). For example, product director 230 may perform global service assurance (e.g., service assurance with multiple cloud resources 260). In some implementations, product director 230 may perform global service assurance as product director 230 receives the performance information and/or the local analytics information from multiple cloud resources 260 (e.g., in real-time). Additionally, or alternatively, product director 230 may perform global service assurance after product director 230 receives the performance information and/or the local analytics information from the multiple cloud resources 260 (e.g., on a periodic basis). Additionally, or alternatively, product director 230 may perform global service assurance based on receiving an indication that product director 230 is to perform global service assurance.

When performing global service assurance, product director 230 may modify, update, reconfigure, adjust, etc. one or more VNFs associated with one or more cloud resources 260 to assure that network services, associated with the one or more cloud resources 260, are being adequately provided to service locations associated with the network services. In other words, product director 230 may assure that network services are being globally provided (e.g., across multiple cloud resources 260), whereas a particular cloud resource 260 may assure that network services are being locally provided (e.g., by the particular cloud resource 260). In some implementations, product director 230 may perform global service assurance by relocating one or more VNFs, running on a particular cloud resource 260, to another cloud resource 260 or by relocating the one or more VNFs to another portion (e.g., another server, another router, etc.) of cloud resource 260. Additionally, or alternatively, product director 230 may perform global service assurance by modifying, updating, reconfiguring, adjusting, recreating, etc. the one or more VNFs in another manner.

Additionally, or alternatively, product director 230 may perform global service assurance based on global analytics information associated with multiple cloud resources 260. For example, product director 230 may receive the performance information and/or the local analytics information from multiple cloud resources 260, may perform (e.g., based on an algorithm, a model, etc. stored by product director 230) global analytics based on the performance information and/or the local analytics information to determine global analytics information. In this example, product director 230 may modify one or more VNFs, associated with the one or more cloud resources 260, based on the global analytics information (e.g., to assure that network services are adequately provided via the one or more cloud resources 260). In some implementations, product director 230 may perform global service assurance based on the performance information, the local analytics information, environmental information, geo-political information, and/or information associated with one or more physical devices included in service provider network 270.

In this way, product director 230 and/or cloud resource 260 may monitor, update, configure, adjust, modify, etc. VNFs in order to continuously assure the provisioning of network services to service locations.

Although FIG. 4 shows example operations of process 400, in some implementations, process 400 may include additional operations, different operations, fewer operations, or differently arranged operations than those depicted in FIG. 4. Additionally, or alternatively, one or more of the operations of process 400 may be performed in parallel.

Figure 5:
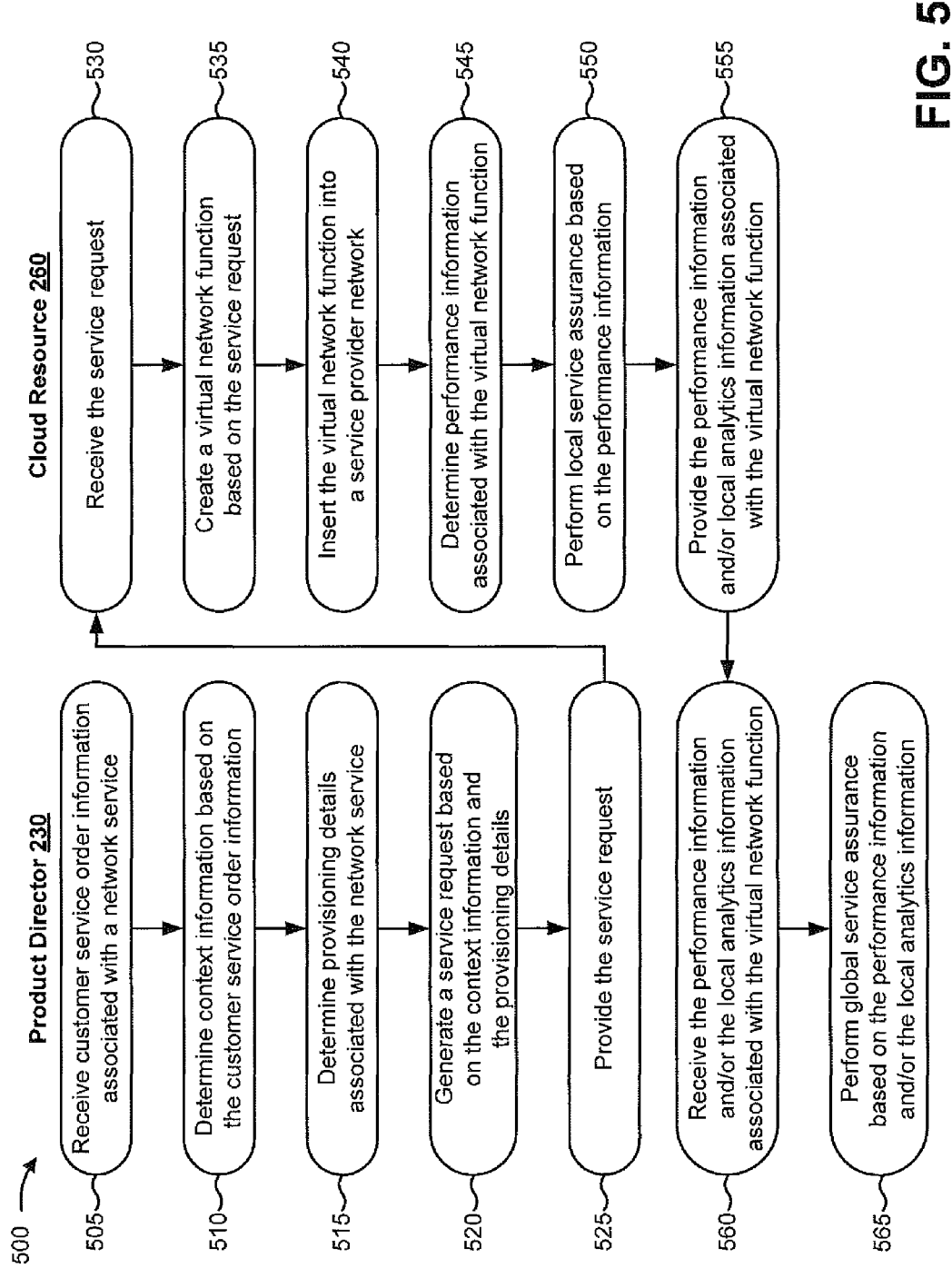
FIG. 5 is a flow chart of an example process for creating a virtual network function associated with providing a network service, inserting the virtual network function into a service provider network to allow the network service to be provided to the service location, and monitoring performance information associated with the virtual network function.

FIG. 5 is a flow chart of an example process 500 for creating a virtual network function associated with providing a network service, inserting the virtual network function into a service provider network to allow the network service to be provided to the service location, and monitoring performance information associated with the virtual network function. In some implementations, one or more process blocks of FIG. 5 may be performed by product director 230 or cloud resource 260. In some implementations, one or more process blocks of FIG. 5 may be performed by another device or a group of devices separate from or including product director 230 or cloud resource 260, such as another device included in environment 200.

As shown in FIG. 5, process 500 may include receiving customer service order information associated with a network service (block 505). For example, product director 230 may receive customer service order information associated with a network service, as discussed above.

As further shown in FIG. 5, process 500 may include determining context information based on the customer service order information (block 510). For example, product director 230 may determine context information based on the customer service order information, as discussed above.

As further shown in FIG. 5, process 500 may include determining provisioning details associated with the network service (block 515). For example, product director 230 may determine provisioning details associated with the network service, as discussed above.

As further shown in FIG. 5, process 500 may include generating a service request based on the context information (block 520). For example, product director 230 may generate a service request based on the context information, as discussed above.

As further shown in FIG. 5, process 500 may include providing the service request (block 525). For example, product director 230 may provide the service request to cloud resource 260, as discussed above.

As further shown in FIG. 5, process 500 may include receiving the service request (block 530). For example, cloud resource 260 may receive the service request provided by product director 230, as discussed above.

As further shown in FIG. 5, process 500 may include creating a virtual network function based on the service request (block 535). For example, cloud resource 260 may create a VNF based on the service request, as discussed above.

As further shown in FIG. 5, process 500 may include inserting the virtual network function into a service provider network (block 540). For example, cloud resource 260 may insert the VNF into service provider network 270, as discussed above.

As further shown in FIG. 5, process 500 may include determining performance information associated with the virtual network function (block 545). For example, cloud resource 260 may determine performance information associated with the VNF, as discussed above.

As further shown in FIG. 5, process 500 may include performing local service assurance based on the performance information (block 550). For example, cloud resource 260 may perform local service assurance, associated with the VNF, based on the performance information, as discussed above. In some implementations, cloud resource 260 may determine local analytics information in order to perform local service assurance, as discussed above.

As further shown in FIG. 5, process 500 may include providing the performance information and/or local analytics information associated with the virtual network function (block 555). For example, cloud resource 260 may provide the performance information and/or local analytics information, associated with the VNF, to product director 230, as discussed above.

As further shown in FIG. 5, process 500 may include receiving the performance information and/or the local analytics information associated with the virtual network function (block 560). For example, product director 230 may receive the performance information and/or the local analytics information, associated with the virtual network function, provided by cloud resource 260, as discussed above.

As further shown in FIG. 5, process 500 may include performing global service assurance based on the performance information and/or the local analytics information (block 565). For example, product director 230 may perform global service assurance based on the performance information and/or the local analytics information, as discussed above. In some implementations, product director 230 may determine global analytics information in order to perform global service assurance, as discussed above.

Although FIG. 5 shows example blocks of process 500, in some implementations, process 500 may include additional blocks, different blocks, fewer blocks, or differently arranged blocks than those depicted in FIG. 5. Additionally, or alternatively, one or more of the blocks of process 500 may be performed in parallel.

FIGS. 6A-6D are diagrams of an example implementation 600 relating to example processes 400 and 500 shown in FIG. 4 and FIG. 5, respectively. For the purposes of example implementation 600, assume that a customer, John Smith, receives an Internet service, provided via service provider network 270, at a service location (e.g., 123 Oak Street, Potomac, Md.). Further, assume that the customer wishes to add an additional network service, Firewall X, to his existing service (e.g., such that traffic travelling to and/or from the service location passes through Firewall X).

Figure 6A:
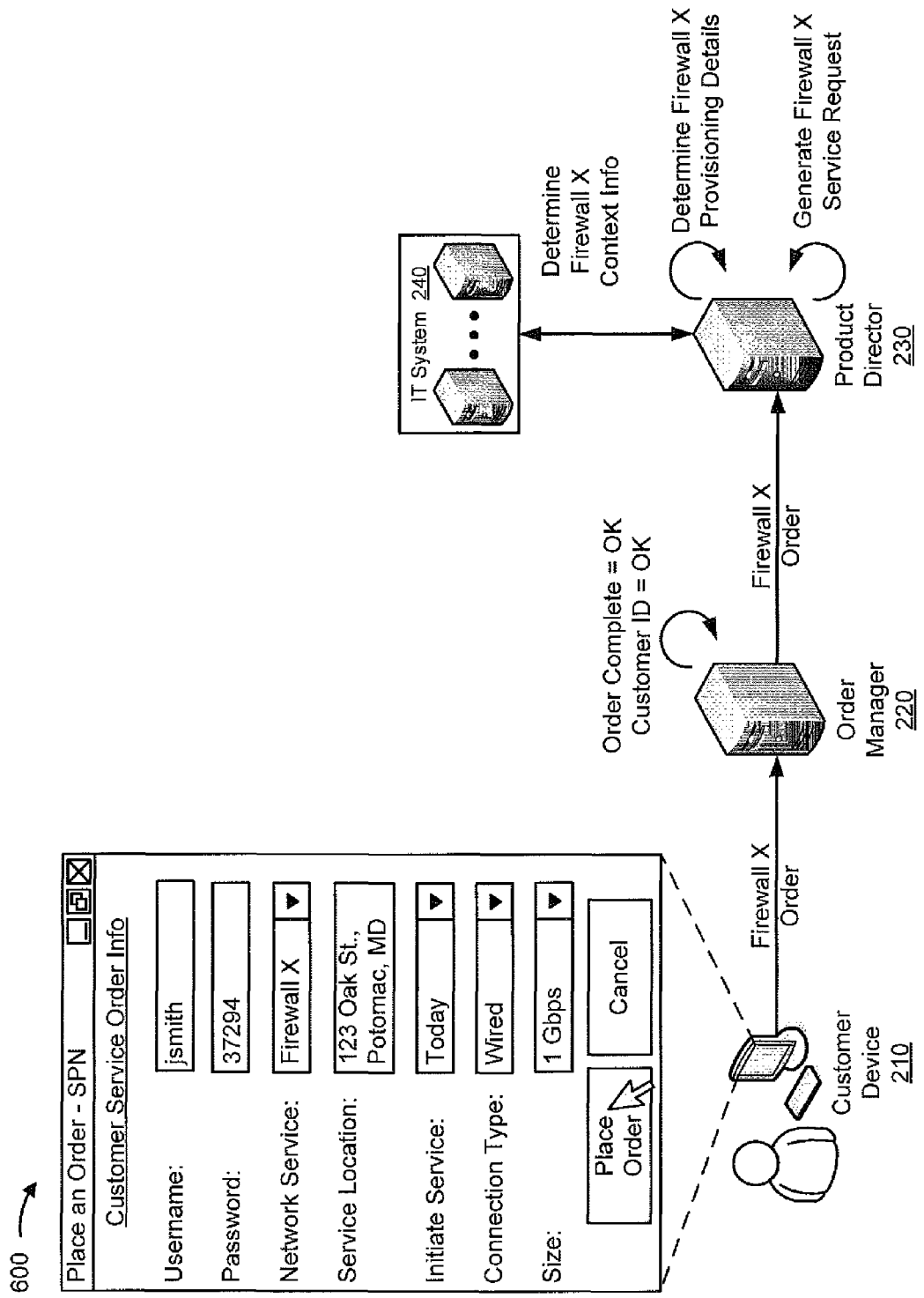
FIGS. 6A-6D are diagrams of an example implementation relating to the example processes shown in FIG. 4 and FIG. 5.

As shown in FIG. 6A, the customer may provide, via a user interface associated with service provider network 270 and displayed via customer device 210, Firewall X order information associated with the Firewall X order. As shown, the customer may provide (e.g., via text boxes, drop down menus, etc. included in the user interface) a username associated with the customer (e.g., jsmith), a password associated with the username (e.g., 37294), information identifying the network service (e.g., Firewall X), information identifying the service location (e.g., 123 Oak Street, Potomac, Md.), a time to initiate provisioning of the network service (e.g., Today), a connection type associated with the service location (e.g., Wired), and sizing information associated with the network service (e.g., 1 Gigabit per second (Gbps)). As further shown, the customer may indicate (e.g., by selecting a Place Order button), that the customer wishes to submit the Firewall X order information.

As shown, customer device 210 may provide the Firewall X order information to order manager 220. As shown, order manager 220 may determine that the Firewall X order information is complete (e.g., that the customer has provided all requisite Firewall X order information required to initiate the network service), and may authenticate the customer (e.g., based on the username and password provided by the customer).

As further shown in FIG. 6A, order manager 220 may forward the Firewall X order information to product director 230. In some implementations, product director 230 may determine (e.g., based on information stored by IT system 240), whether the Firewall X service is available to the service location, and may notify the customer (e.g., via order manager 220 and/or customer device 210), accordingly. As shown, product director 230 may also determine, based on one or more requests provided to IT system 240, Firewall X context information based on the Firewall X order information. As shown, product director 230 may then determine Firewall X provisioning details (e.g., timing information, location information, pricing information, etc.) associated with providing the Firewall X network service. As further shown, product director 230 may create a Firewall X service request based on the Firewall X context information and the Firewall X provisioning details.

Figure 6B:
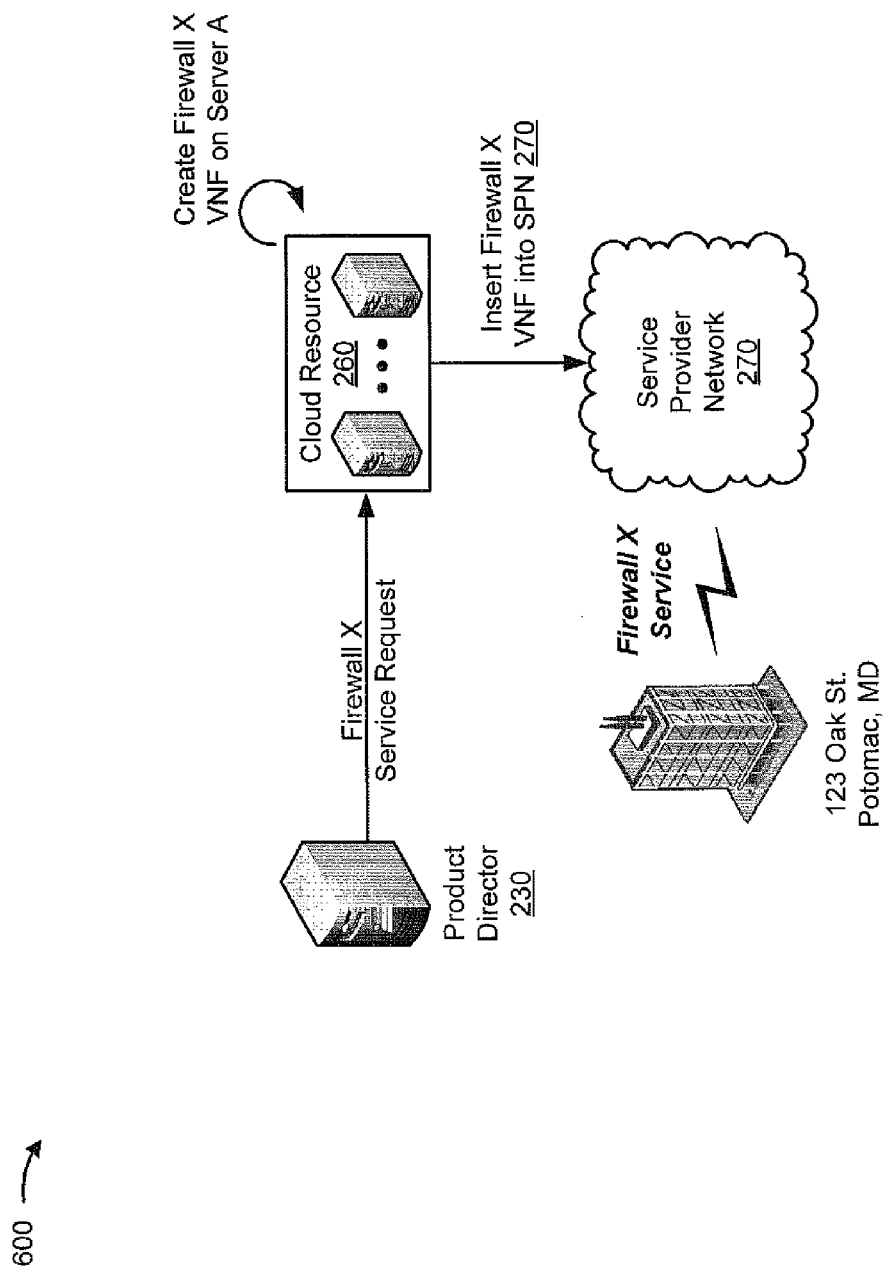

As shown in FIG. 6B, assume that product director 230 identifies cloud resource 260 that is to provide the Firewall X network service to the service location. As shown, product director 230 may provide the Firewall X service request to cloud resource 260. As further shown, cloud resource 260 may receive the Firewall X service request, may create a Firewall X VNF on a server associated with cloud resource 260 and identified as server A. As further shown, cloud resource 260 may insert the Firewall X VNF into service provider network 270. As shown, service provider network 270 may then provide the Firewall X network service to the service location.

Figure 6C:
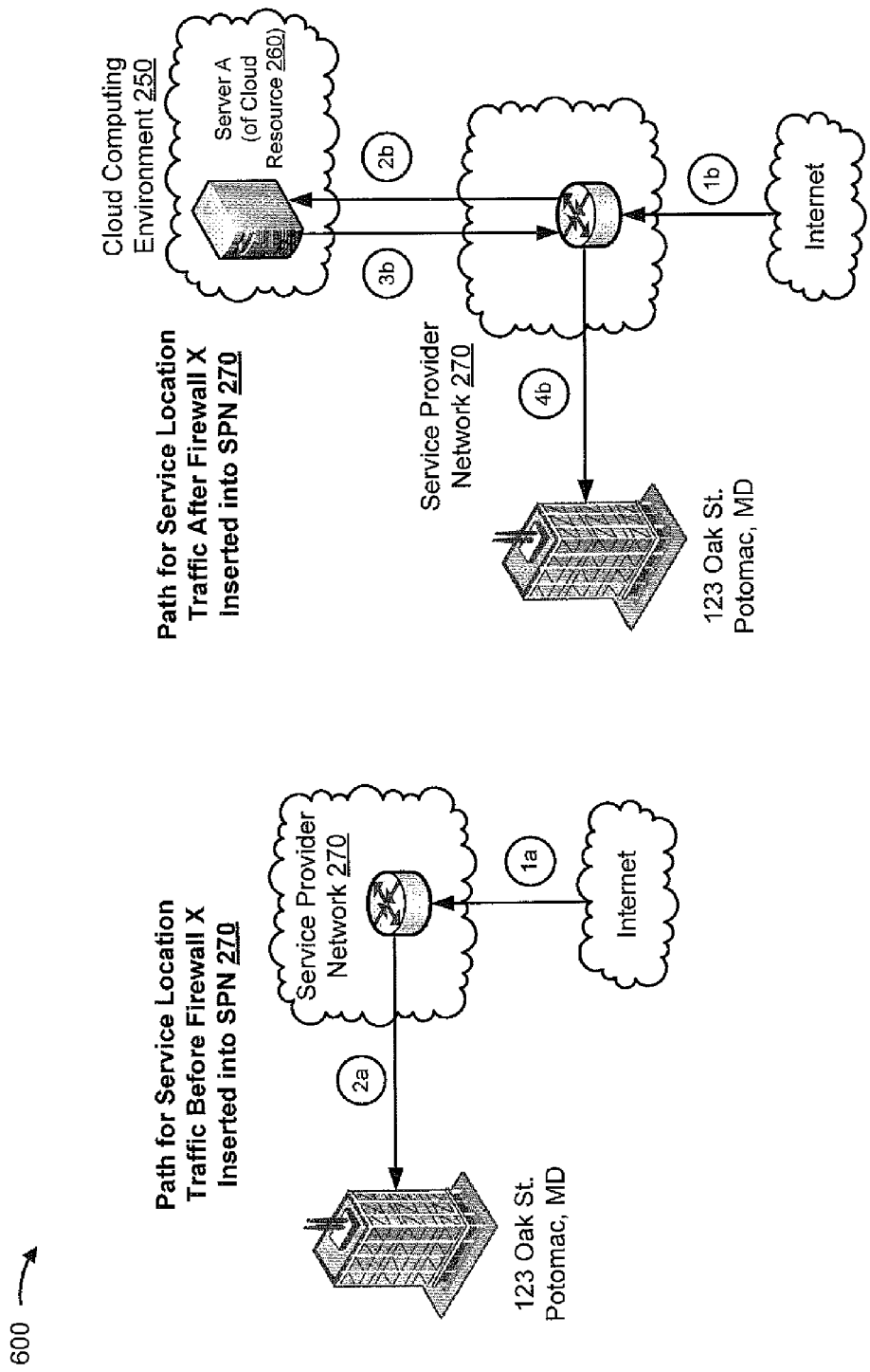

An illustration of the effect of inserting the Firewall X VNF into service provider network 270 is shown in FIG. 6C. As shown in the left portion of FIG. 6C, before the Firewall X VNF is inserted into service provider network 270, traffic destined for the service location may travel from the Internet to a router included in service provider network 270 (step 1a), and from the router to the service location (step 2a).

As shown in the right portion of FIG. 6C, after the Firewall X VNF is inserted into service provider network 270, traffic destined for the service location may travel from the Internet to the router included in service provider network 270 (step 1b), and from the router to server A running the Firewall X VNF (step 2b) (e.g., such that the traffic travels through Firewall X). The traffic may travel from server A back to the router (step 3b), and from the router to the service location (step 4b).

In other words, cloud resource 260 may insert the Firewall X VNF into service provider network 270 by (1) instructing the router, included in service provider network 270, to send traffic, associated with the customer, to the Firewall X VNF, (2) configuring the Firewall X VNF to process the traffic and send the processed traffic back to the router, and (3) by instructing the router to send traffic received from the Firewall X VNF to the service location. In this way, the Firewall X VNF may be inserted into service provider network 270 such that the Firewall X VNF interacts with physical devices included in service provider network 270 in order to provide the network service to the service location.

Figure 6D:
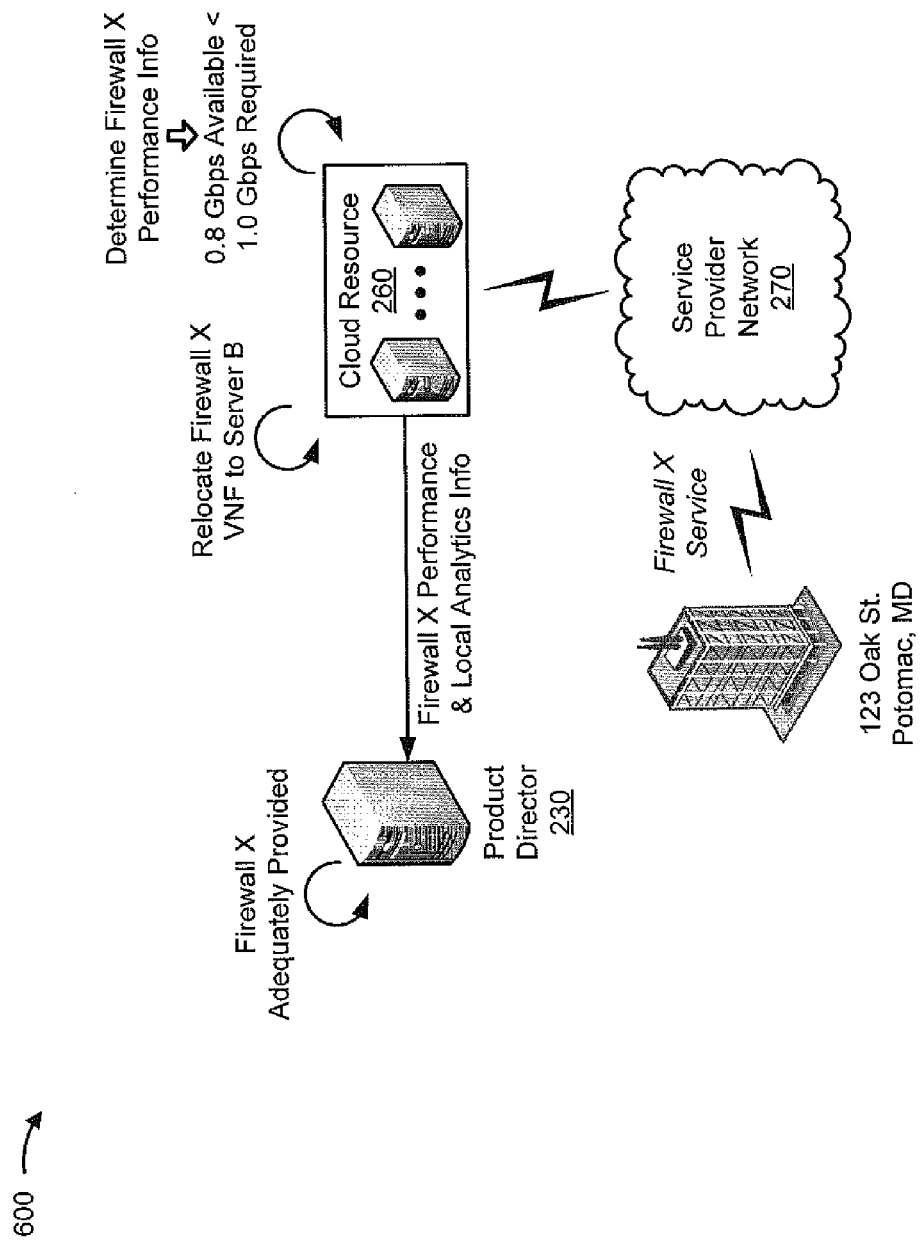

As shown in FIG. 6D, assume that the Firewall X network service is being provided to the service location via cloud resource 260 and service provider network 270. As shown, cloud resource 260 may determine performance information, associated with Firewall X, that indicates that cloud resource 260 has only 0.8 Gbps of bandwidth available for the Firewall X network service being provided to the service location, where 1.0 Gbps is required (e.g., based on the Firewall X order placed by the customer). As shown, cloud resource 260 may determine (e.g., based on performing local network analytics) that cloud resource 260 should relocate the Firewall X VNF to another server associated with cloud resource 260, identified as server B. As shown, cloud resource 260 may relocate the Firewall X VNF to server B and may continue to determine performance information associated with Firewall X. As further shown, cloud resource 260 may provide the performance information and the local analytics information, associated with the Firewall X VNF, to product director 230. As shown, product director 230 may determine that the Firewall X network service is being adequately provided to the service location, and that product director 230 need not take corrective action.

As indicated above, FIGS. 6A-6D are provided merely as an example. Other examples are possible and may differ from what was described with regard to FIGS. 6A-6D.

Implementations described herein may allow a virtual network function, associated with providing a network service to a service location, to be created and inserted into a service provider network such that the virtual network function interacts with physical devices included in the service provider network, and such that the network service is provided to the service location in an agile, on-demand, and/or flexible manner without the need to manually configure, monitor, and/or update devices in the service provider network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more devices to:
receive customer service order information,
the customer service order information including information that identifies a network service and information that identifies a service location associated with the network service, and
the network service being associated with a service provider network; determine context information based on the customer service order information,
the context information including information associated with providing the network service to the service location via the service provider network;
determine provisioning details associated with the context information;
generate a service request based on the context information and the provisioning details,
the context information including information associated with creating a virtual network function (VNF) to provide the network service to the service location via the service provider network;
create the VNF based on the service request,
the VNF being created such that the VNF operates on a computing device associated with the system, and
the VNF to provide the network service;
insert the VNF into the service provider network,
the VNF being inserted to cause the network service to be provided to the service location via the service provider network, and
the VNF interacting with a physical device of the service provider network;
instruct the physical device to send traffic to the VNF;
configure the VNF to:
provide the network service to the traffic received from the physical device, and
send serviced traffic back to the physical device;
instruct the physical device to send the serviced traffic to the service location;
determine performance information associated with the VNF in real-time or on a periodic basis;
determine local analytics information based on the performance information associated with the VNF;
predict a future traffic pattern associated with the VNF based on the local analytics information; and
reconfigure the VNF based on the predicted future traffic pattern in real-time or on a periodic basis.

2. The system of claim 1, where the one or more devices, when receiving the customer service order information, are to:

determine that the network service is available at the service location; and
provide a notification that the network service is available at the service location,
the notification being provided to notify a customer, associated with the customer service order information, that the network service is available at the service location.

3. The system of claim 1, where the one or more devices are further to:
send a request associated with determining the context information; and
determine the context information based on a response to the request.

4. The system of claim 1, where the one or more devices, when inserting the VNF into the service provider network, are to:
provide a billing notification, associated with the network service, based on inserting the VNF into the service provider network,
the billing notification being provided to notify a billing device, associated with the service provider network, to initiate billing for the network service.

5. The system of claim 1, where the one or more devices are further to:
determine that the customer service order information is complete customer service order information; and
where the one or more devices, when determining the context information, are to:
determine the context information after determining that the customer service order information is complete customer service order information.

6. The system of claim 1, where the one or more devices are further to:
perform global service assurance based on the local analytics information.

7. The system of claim 6, where the one or more devices, when performing the global service assurance, are to:
perform the global service assurance in real time.

8. The system of claim 1, where the one or more devices are further to:
perform local service assurance based on the performance information.

9. A non-transitory computer-readable medium storing instructions, the instructions comprising:
one or more instructions that, when executed by one or more processors, cause the one or more processors to:
receive order information associated with a network service,
the order information including information that identifies the network service,
the order information including information that identifies a service location associated with the network service, and
the network service being associated with a service provider network;
determine context information associated with the order information,
the context information including information to configure a virtual network function (VNF) such that the network service is provided to the service location via the service provider network;
determine provisioning details associated with the context information
generate a service request based on the context information and the provisioning details, the context information including information associated with creating the VNF to provide the network service to the service location via the service provider network;
create the VNF based on the service request,
the VNF being created such that the VNF runs on a computing device, and
the VNF to provide the network service;
insert the VNF into the service provider network,
the VNF being inserted into the service provider network to allow the network service to be provided to the service location via the service provider network, and
the VNF interacting with a physical device of the service provider network instruct the physical device to send traffic to the VNF;
configure the VNF to:
provide the network service to the traffic received from the physical device, and
send serviced traffic back to the physical device;
instruct the physical device to send the serviced traffic to the service location;
determine performance information associated with the VNF in real-time or on a periodic basis;
determine that the performance information associated with the VNF does not satisfy a requirement;
determine local analytics information based on the performance information associated with the VNF;
predict a future traffic pattern associated with the VNF based on the local analytics information; and
reconfigure the VNF based on the predicted future traffic pattern in real-time or on a periodic basis.

10. The non-transitory computer-readable medium of claim 9, where the one or more instructions, that cause the one or more processors to receive the order information, cause the one or more processors to:
determine that the network service is available at the service location; and
provide a notification that the network service is available at the service location,
the notification being provided to notify a customer, associated with the order information, that the network service is available at the service location.

11. The non-transitory computer-readable medium of claim 9, where the one or more instructions, that cause the one or more processors to insert the VNF into the service provider network, cause the one or more processors to:
provide a billing notification, associated with the network service, based on inserting the VNF into the service provider network,
the billing notification being provided to notify a billing device, associated with the service provider network, to initiate billing for the network service.

12. The non-transitory computer-readable medium of claim 9, where the one or more instructions, when executed by the one or more processors, further cause the one or more processors to:
determine that the order information is complete order information; and
where the one or more instructions, that cause the one or more processors to determine the context information, cause the one or more processors to:
determine the context information after determining that the order information is complete order information.

13. The non-transitory computer-readable medium of claim 9, where the one or more instructions, when executed by the one or more processors, further cause the one or more processors to:
perform global service assurance based on the local analytics information.

14. The non-transitory computer-readable medium of claim 13, where the one or more instructions, that cause the one or more processors to perform the global service assurance, cause the one or more processors to:
perform the global service assurance in real time.

15. A method, comprising:
determining, by one or more devices, customer service order information,
the customer service order information including information that identifies a network service and information that identifies a service location to which the network service is to be provided, and
the network service being associated with a service provider network;
receiving, by the one or more devices, context information associated with the customer service order information;
determining, by the one or more devices, provisioning details associated with the context information;
generating, by the one or more devices, a service request based on the context information and the provisioning details,
the context information including information associated with creating a virtual network function (VNF) to provide the network service to the service location via the service provider network;
causing, by the one or more devices, the VNF to be created based on the service request,
the VNF being created such that the VNF is located on a computing device, and
the VNF to provide the network service; and
causing, by the one or more devices, the VNF to be inserted into the service provider network,
the VNF being inserted such that the network service is provided to the service location via the service provider network, and
the VNF interacting with a physical device of the service provider network;
instructing, by the one or more devices, the physical device to send traffic to the VNF;
configuring, by the one or more devices, the VNF to:
provide the network service to the traffic received from the physical device, and
send serviced traffic back to the physical device;
instructing, by the one or more devices, the physical device to send the serviced traffic to the service location;
determining, by the one or more devices, performance information associated with the VNF in real-time or on a periodic basis;
determining, by the one or more devices, local analytics information based on the performance information associated with the VNF;
predicting, by the one or more devices, a future traffic pattern associated with the VNF based on the local analytics information; and
reconfiguring, by the one or more devices, the VNF based on the predicted future traffic pattern in real-time or on a periodic basis.

16. The method of claim 15, where determining the customer service order information comprises:

determining that the network service is available at the service location; and providing a notification that the network service is available at the service location, the notification being provided to notify a customer, associated with the customer service order information, that the network service is available at the service location.

17. The method of claim 15, further comprising:

providing a request associated with determining the context information; and receiving the context information in a response to the request.

18. The method of claim 15, further comprising:

performing global service assurance based on the local analytics information.

19. The method of claim 18, where performing the global service assurance comprises:

performing the global service assurance in real time.

20. The method of claim 15, further comprising:

performing local service assurance based on the performance information.

* * * * *